(12) United States Patent
Park et al.

(10) Patent No.: US 11,715,485 B2
(45) Date of Patent: Aug. 1, 2023

(54) ARTIFICIAL INTELLIGENCE APPARATUS FOR CONVERTING TEXT AND SPEECH IN CONSIDERATION OF STYLE AND METHOD FOR THE SAME

(71) Applicant: LG ELECTRONICS INC., Seoul (KR)

(72) Inventors: Jisoo Park, Seoul (KR); Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 286 days.

(21) Appl. No.: 16/490,316

(22) PCT Filed: May 17, 2019

(86) PCT No.: PCT/KR2019/005899
§ 371 (c)(1),
(2) Date: Aug. 30, 2019

(87) PCT Pub. No.: WO2020/235696
PCT Pub. Date: Nov. 26, 2020

(65) Prior Publication Data
US 2021/0335381 A1  Oct. 28, 2021

(51) Int. Cl.
*G10L 25/30* (2013.01)
*G06N 3/08* (2023.01)
(Continued)

(52) U.S. Cl.
CPC ............... *G10L 25/30* (2013.01); *G06N 3/08* (2013.01); *G10L 13/08* (2013.01); *G10L 15/26* (2013.01)

(58) Field of Classification Search
CPC ......... G10L 25/30; G10L 13/08; G10L 15/26; G06N 3/08
See application file for complete search history.

(56) References Cited

U.S. PATENT DOCUMENTS

| 7,092,870 B1 * | 8/2006 | Chen ..................... G06F 16/313 |
| | | 707/E17.084 |
| 10,706,837 B1 * | 7/2020 | Chicote .................. G10L 13/02 |

(Continued)

FOREIGN PATENT DOCUMENTS

| JP | 2015-180966 A | 10/2015 |
| KR | 10-2013-0062099 A | 6/2013 |

(Continued)

OTHER PUBLICATIONS

Maadeed et al. "Automatic prediction of age, gender, and nationality in offline handwriting", EURASIP Journal on Image and Video Processing Jan. 10, 2014 (Year: 2014).*

*Primary Examiner* — Bhavesh M Mehta
*Assistant Examiner* — Darioush Agahi
(74) *Attorney, Agent, or Firm* — Birch, Stewart, Kolasch & Birch, LLP

(57) ABSTRACT

According to an embodiment of the present invention, there is provided an artificial intelligence (AI) apparatus for mutually converting a text and a speech, including: a memory configured to store a plurality of Text-To-Speech (TTS) engines; and a processor configured to: obtain image data containing a text, determine a speech style corresponding to the text, generate a speech corresponding to the text by using a TTS engine corresponding to the determined speech style among the plurality of TTS engines, and output the generated speech.

3 Claims, 16 Drawing Sheets

(51) Int. Cl.
*G10L 13/08* (2013.01)
*G10L 15/26* (2006.01)

(56) References Cited

U.S. PATENT DOCUMENTS

| | | | | |
|---|---|---|---|---|
| 2005/0096909 | A1* | 5/2005 | Bakis | G10L 13/027 704/260 |
| 2008/0056578 | A1* | 3/2008 | Shilman | G06V 30/387 382/187 |
| 2011/0035662 | A1* | 2/2011 | King | G06F 40/174 715/273 |
| 2011/0046943 | A1* | 2/2011 | Lee | G06F 40/20 704/9 |
| 2011/0093272 | A1* | 4/2011 | Isobe | G10L 13/10 704/258 |
| 2012/0304057 | A1* | 11/2012 | Labsky | G10L 15/14 715/256 |
| 2013/0141551 | A1 | 6/2013 | Kim | |
| 2014/0025382 | A1* | 1/2014 | Chen | G10L 13/10 704/260 |
| 2014/0358826 | A1* | 12/2014 | Traupman | G06N 7/005 706/46 |
| 2016/0093289 | A1* | 3/2016 | Pollet | G10L 13/027 704/260 |
| 2016/0379623 | A1* | 12/2016 | Luan | G06F 3/0482 704/260 |
| 2017/0076714 | A1* | 3/2017 | Mori | G10L 13/033 |
| 2017/0186418 | A1* | 6/2017 | Mairano | G10L 13/07 |
| 2017/0193533 | A1* | 7/2017 | Lai | G06V 20/30 |
| 2017/0270484 | A1* | 9/2017 | Cengiz | G06N 7/005 |
| 2018/0233163 | A1* | 8/2018 | Eagleman | G10L 15/02 |
| 2019/0096385 | A1* | 3/2019 | Kang | G06N 3/0454 |
| 2020/0365137 | A1* | 11/2020 | Barra Chicote | G10L 13/02 |

FOREIGN PATENT DOCUMENTS

KR 10-1509196 B1 4/2015
KR 10-2018-0038318 A 4/2018

\* cited by examiner

1501

1502 — The quick brown fox jumps over the lazy dog.

1503

1504 — THE QUICK BROWN FOX JUMPS OVER THE LAZY DOG.

1505

1506 — The quick brown fox jumps over the lazy dog.

ARTIFICIAL INTELLIGENCE APPARATUS FOR CONVERTING TEXT AND SPEECH IN CONSIDERATION OF STYLE AND METHOD FOR THE SAME

CROSS REFERENCE TO RELATED APPLICATIONS

This application is the National Phase of PCT International Application No. PCT/KR2019/005899, filed on May 17, 2019, all of which is hereby expressly incorporated by reference into the present application.

TECHNICAL FIELD

The present invention relates to an artificial intelligence apparatus for mutually converting a text and a speech into, and a method for the same. Specifically, the present invention relates to an artificial intelligence apparatus and method for converting an inputted text into a speech in consideration of a style of the text or converting an inputted speech into a text in consideration of a style of the speech.

BACKGROUND ART

There have been requests for a service for converting a speech to a text or a text to a speech. A service for converting a speech into a text is used to automatically generate captions in a video medium or used in various services based on speech recognition, and a service for converting a text into a speech is used in a speech guidance service.

However, conventionally, a service for mutually converting a speech and a text uses only a predetermined speech-to-text (STT) engine or a text-to-speech (TTS) engine, and cannot reflect various speech styles and text styles. In addition, speeches uttered or texts written by the same user have all been converted into texts or speeches having the same style.

DISCLOSURE OF THE INVENTION

Technical Problem

An object of the present invention is to provide an artificial intelligence apparatus and method for converting an acquired text into a speech having a speech style corresponding to the acquired text and outputting the speech.

Another object of the present invention is to provide an artificial intelligence apparatus and method for converting an acquired speech into a text having a text style corresponding to the acquired speech and outputting the text.

Another object of the present invention is to provide an artificial intelligence apparatus and method for mutually converting a speech and a text differently for a plurality of speech utterers or text creators.

Technical Solution

According to an embodiment of the present invention, there is provided an artificial intelligence device and method for obtaining image data, determining a speech style corresponding to a text, generating a speech corresponding to the text by using a text-to-speech (TTS) engine corresponding to the determined speech style, and outputting the generated speech.

Further, according to an embodiment of the present invention, there is provided an artificial intelligence device and method for obtaining sound data, determining a text style corresponding to a speech, generating a text corresponding to the speech by using a speech-to-text (STT) engine corresponding to the determined text style, and outputting the generated text.

Further, according to an embodiment of the present invention, there is provided an artificial intelligence apparatus and method for determining a speaker of an input speech or a creator of an input text, and, if a registered user is the speaker of the speech or the creator of the text, mutually converting the speech and the text based on the speech style or text style of the registered user.

Advantageous Effects

According to various embodiments of the present invention, a speech and a text may be mutually converted in consideration of the style of an input speech or text, thereby providing a more uniform and realistic speech and text interconversion service to a user.

In addition, according to various embodiments of the present disclosure, a speech and a text may be mutually converted by reflecting the speech style and the text style of each registered user, thereby providing a personalized speech and text interconversion service for each registered user.

BEST MODE

Figure 1:
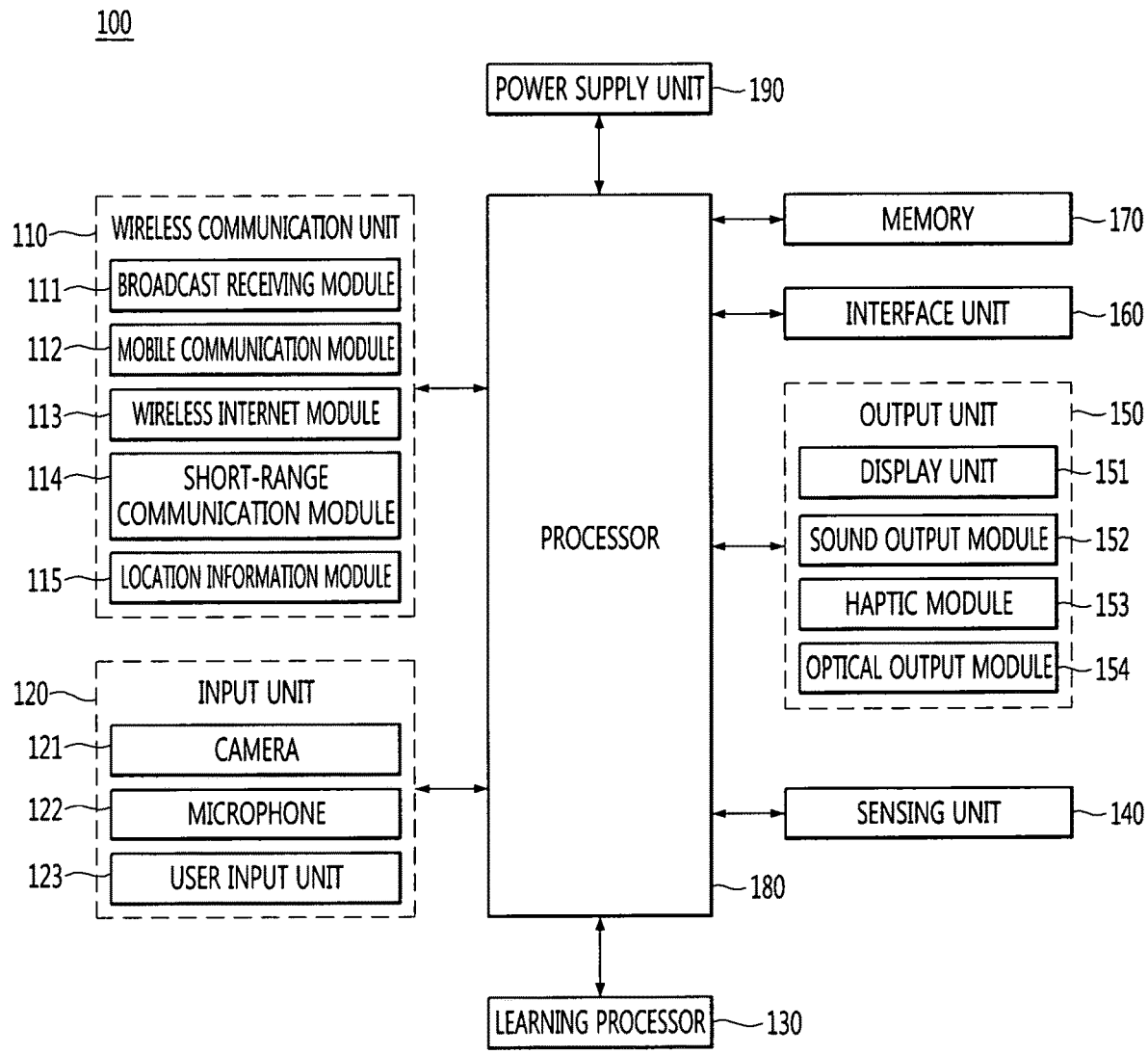
FIG. 1 is a block diagram illustrating a configuration of a terminal according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network may be specified in structure by a configuration of a model, an activation function, a loss function, or a cost function, a learning algorithm, an optimization algorithm, and the like. A hyperparameter may be set in advance before the learning, and then, a model parameter may be set through the learning to specify contents thereof.

For example, factors that determine the structure of the artificial neural network may include the number of hidden layers, the number of hidden nodes included in each of the hidden layers, an input feature vector, a target feature vector, and the like.

The hyperparameter includes various parameters that have to be initially set for learning such as an initial value of the model parameter. Also, the model parameter includes various parameters to be determined through the learning.

For example, the hyperparameter may include an initial weight value between the nodes, an initial bias between the nodes, a mini-batch size, the number of learning repetition, a learning rate, and the like. Also, the model parameter may include a weight between the nods, a bias between the nodes, and the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use a mean squared error (MSE) or a cross entropy error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

Here, the step size may mean the learning rate.

In the GD, a gradient may be acquired by partially differentiating the loss function into each of the model parameters, and the model parameters may be updated by changing the model parameters by the learning rate in a direction of the acquired gradient.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

FIG. 1 is a block diagram illustrating a configuration of the terminal 100 according to an embodiment of the present invention.

Hereinafter, the terminal 100 may be called an artificial intelligence (AI) apparatus 100.

The terminal 100 may be implemented for a TV, a projector, a mobile phone, a smart phone, a laptop computer, a digital broadcasting terminal, a personal digital assistant (PDA), a portable multimedia player (PMP) a slate PC, a tablet PC, an ultrabook, a wearable device (for example, a smartwatch, a smart glass, a head mounted display (HMD)), a set-top box (STB), a DMB receiver, a radio, a washing machine, a refrigerator, a desktop computer, fixed equipment such as a digital signage, movable equipment, and the like.

That is, the terminal device 100 may be implemented as various appliances that are used at home, and may be applied to a fixed or movable robot.

The terminal device 100 can perform a function of a voice agent. The voice agent may be a program that recognizes voice of a user and output a response suitable for the recognized user's voice using voice.

Referring to FIG. 1, the terminal 100 may include a wireless communication unit 110, an input unit 120, a learning processor 130, a sensing unit 140, an output unit 150, an interface unit 160, a memory 170, a processor 180, and a power supply unit 190.

The trained model may be mounted on the terminal 100.

The trained model may be implemented as hardware, software, or a combination of the hardware and the software. When a portion or the whole of the trained model is implemented as the software, one or more commands constituting the trained model may be stored in the memory 170.

The wireless communication unit 110 may include at least one of a broadcast receiving module 111, a mobile communication module 112, a wireless Internet module 113, a short-range communication module 114, or a location information module 115.

The broadcast receiving module 111 of the wireless communication unit 110 may receive a broadcast signal and/or broadcast related information from an external broadcast management server through a broadcast channel.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

The input unit 120 may acquire training data for the model learning and input data to be used when an output is acquired using the trained model.

The input unit 120 may acquire input data that is not processed. In this case, the processor 180 or the learning processor 130 may preprocess the acquired data to generate training data that is capable of being inputted into the model learning or preprocessed input data.

Here, the preprocessing for the input data may mean extracting of an input feature from the input data.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The learning processor 130 learns a model composed of the artificial neural network by using the training data.

Particularly, the learning processor 130 may determine optimized model parameters of the artificial neural network by repeatedly learning the artificial neural network by using the above-described various learning techniques.

In this specification, since the artificial neural network is learned by using the training data, the artificial neural network of which the parameters are determined may be called a learned model or a trained model.

Here, the trained model may be used to infer results for new input data rather than training data.

The learning processor 130 may be configured to receive, classify, store, and output information which is to be used for data mining, data analysis, intelligent decision, and machine learning algorithms.

The learning processor 130 may include one or more memory units which are configured to store data received, detected, sensed, generated, pre-defined, or outputted by another component, another device, another terminal, or an apparatus communicating with the terminal.

The learning processor 130 may include a memory which is integrated into or implemented in a terminal. In some embodiments, the learning processor 130 may be implemented with the memory 170.

Optionally or additionally, the learning processor 130 may be implemented with a memory associated with a terminal like an external memory directly coupled to the terminal or a memory which is maintained in a server communicating with the terminal.

In another embodiment, the learning processor 130 may be implemented with a memory maintained in a cloud computing environment or another remote memory position accessible by a terminal through a communication manner such as a network.

The learning processor 130 may be configured to store data in one or more databases, for supervised or unsupervised learning, data mining, prediction analysis, or identifying, indexing, categorizing, manipulating, storing, searching for, and outputting data to be used in another machine. Here, the database may be implemented using a memory 170, a memory 230 of the learning device 200, a memory maintained under cloud computing environments, or other remote memory locations that are accessible by the terminal through a communication scheme such as a network.

Information stored in the learning processor 130 may be used by the processor 180 or one or more other controllers of a terminal by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a terminal, based on information determined or generated by using a data analysis algorithm and a machine learning algorithm. To this end, the processor 180 may request, search for, receive, or use data of the learning processor 130 and may control the terminal to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a terminal. Also, each of the sub-modules may provide various functions in addition to vocabulary index, user data, a work flow model, a service model, and an automatic speech recognition (ASR) system.

In another embodiment, another aspect of the processor 180 or a terminal may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a terminal, for collecting information which is to be processed and stored in the learning processor 130.

Collecting of information may include an operation of sensing information through a sensor, an operation of extracting information stored in the memory 170, or an operation of receiving information through a communication means from another terminal, an entity, or an external storage device.

The processor 180 may collect usage history information from the terminal and may store the collected usage history information in the memory 170.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 110.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the terminal is determined based on the data analysis algorithm, the machine learning algorithm, and technology, the processor 180 may control elements of the terminal for executing the determined operation. Also, the processor 180 may control the terminal according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a mobile terminal, environmental information around a mobile terminal, or user information.

For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, an image I/O port, and or an earphone port. In correspondence to that an external device is connected to the interface unit 160, the mobile terminal 100 may perform an appropriate control relating to the connected external device.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

The memory 170 may store data for supporting various functions of the terminal 100.

The memory 170 may store a plurality of application programs or applications executed in the terminal 100, pieces of data and instructions for an operation of the terminal 100, and pieces of data (for example, at least one piece of algorithm information for machine learning) for an operation of the learning processor 130.

The memory 170 may store a model that is learned in the learning processor 130 or the learning device 200.

Here, the memory 170 may store the learned model into a plurality of versions according to a learning time point, a learning progress, and the like.

Here, the memory 170 may store the input data acquired by the input unit 120, the learning data (or the training data) used for the model learning, a learning history of the model, and the like.

Here, the input data stored in the memory 170 may be input data itself, which is not processed, as well as data that is processed adequate for the model learning.

The processor 180 may control overall operations of the mobile terminal 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 1. Furthermore, in order to execute the application program, the processor 180 may combine at least two of the components in the mobile terminal 100 and may then operate it.

As described above, the processor 180 may control an operation associated with an application program and an overall operation of the terminal 100. For example, when a state of the terminal 100 satisfies a predetermined condition, the processor 180 may execute or release a lock state which limits an input of a control command of a user for applications.

The power supply unit 190 may receive external power or internal power under a control of the processor 180 and may then supply power to each component in the mobile terminal 100. The power supply unit 190 includes a battery and the battery may be a built-in battery or a replaceable battery.

Figure 2:
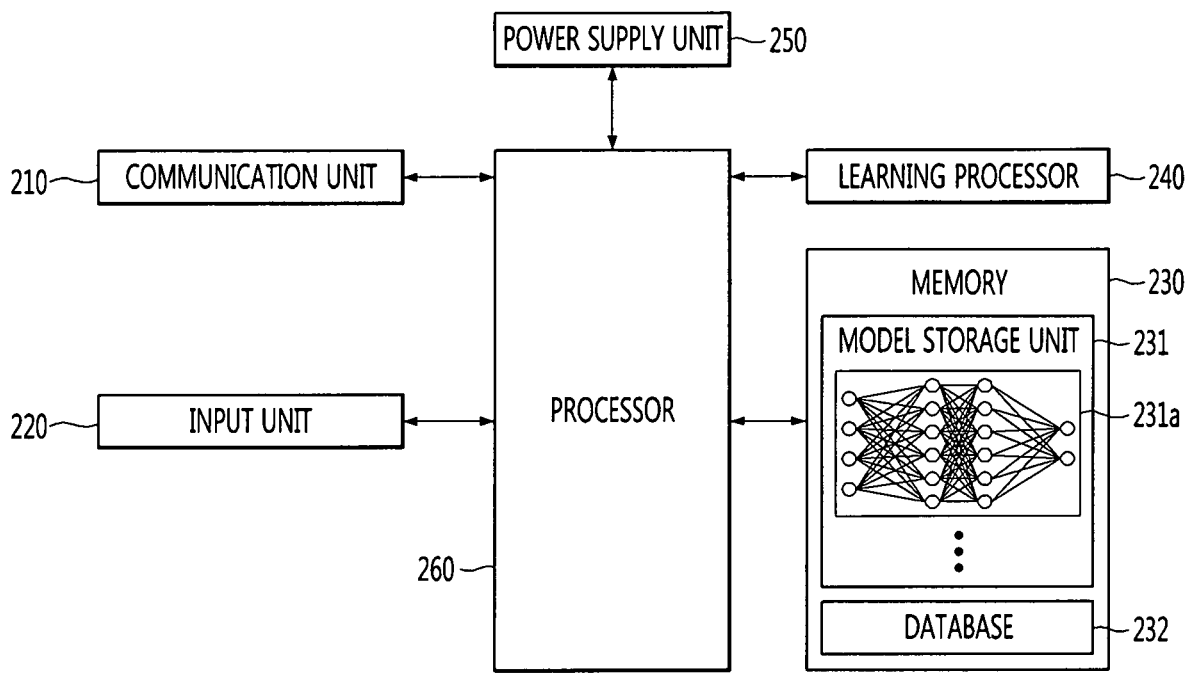
FIG. 2 is a block diagram illustrating a configuration of a learning device of an artificial neural network according to an embodiment of the present invention.

FIG. 2 is a block diagram illustrating a configuration of a learning device 200 of an artificial neural network according to an embodiment of the present invention.

The learning device 200 may be a device or server that is separately provided outside the terminal 100 and perform the same function as the learning processor 130 of the terminal 100.

That is, the learning device 200 may be configured to receive, classify, store, and output information to be used for data mining, data analysis, intelligent decision making, and machine learning algorithm. Here, the machine learning algorithm may include a deep learning algorithm.

The learning device 200 may communicate with at least one terminal 100 and analyze or train the data instead of the terminal 100 or by assisting the terminal 100 to derive results. Here, the assisting for the other devices may mean distribution of computing power through distribution processing.

The learning device 200 for the artificial neural network may be a variety of apparatuses for learning an artificial neural network and may be generally called a server or called a learning device or a learning server.

Particularly, the learning device 200 may be implemented not only as a single server but also as a plurality of server sets, a cloud server, or a combination thereof.

That is, the learning device 200 may be provided in a plurality to constitute the learning device set (or the cloud server). At least one or more learning device 200 included in the learning device set may analyze or train data through the distribution processing to derive the result.

The learning device 200 may transmit the model that is learned by the machine learning or the deep learning to the terminal periodically or by demands.

Referring to FIG. 2, the learning device 200 may include a communication unit 210, an input unit 220, a memory 230, a learning processor 240, a power supply unit 250, a processor 260, and the like.

The communication unit 210 may correspond to a constituent including the wireless communication unit 110 and the interface unit 160 of FIG. 1. That is, the communication unit 210 may transmit and receive data to/from other devices through wired/wireless communication or an interface.

The input unit 220 may be a constituent corresponding to the input unit 120 of FIG. 1 and may acquire data by receiving the data through the communication unit 210.

The input unit 220 may acquire training data for the model learning and input data for acquiring an output by using the trained model.

The input unit 220 may acquire input data that is not processed. In this case, the processor 130 may preprocess the acquired data to generate training data that is capable of being inputted into the model learning or preprocessed input data.

Here, the preprocessing for the input data, which is performed in the input unit 220, may mean extracting of an input feature from the input data.

The memory 230 is a constituent corresponding to the memory 170 of FIG. 1.

The memory 230 may include a model storage unit 231 and a database 232.

The model storage unit 231 may store a model being learned or a learned model (or an artificial neural network 231a) through the learning processor 240 to store the updated model when the model is updated through the learning.

Here, the model storage unit 231 may store the trained model into a plurality of versions according to a learning time point, a learning progress, and the like.

The artificial neural network 231a illustrated in FIG. 2 may be merely an example of the artificial neural network including a plurality of hidden layers, and the artificial neural network of the present invention is not limited thereto.

The artificial neural network 231a may be implemented as hardware, software, or a combination of the hardware and the software. When a portion or the whole of the artificial neural network 231a is implemented as the software, one or more commands constituting the artificial neural network 231a may be stored in the memory 230.

The database 232 may store the input data acquired by the input unit 220, the learning data (or the training data) used for the model learning, a learning history of the model, and the like.

The database 232 stored in the memory 232 may be input data itself, which is not processed, as well as data that is processed adequate for the model learning.

The learning processor 240 is a constituent corresponding to the learning processor 130 of FIG. 1.

The learning processor 240 may train (or learn) the artificial neural network 231a by using the training data or the training set.

The learning processor 240 may directly acquire the processed data of the input data acquired through the input unit 220 to train the artificial neural network 231a or acquire the processed input data stored in the database 232 to train the artificial neural network 231a.

Particularly, the learning processor 240 may determine optimized model parameters of the artificial neural network 231a by repeatedly learning the artificial neural network 231a by using the above-described various learning techniques.

In this specification, since the artificial neural network is learned by using the training data, the artificial neural network of which the parameters are determined may be called a learned model or a trained model.

Here, the trained model may infer a result value in a state in which the trained model is installed on the learning device 200 or may be transmitted to the other device such as the terminal 100 through the communication unit 210 so as to be mounted.

Also, when the trained model is updated, the updated trained model may be transmitted to the other device such as the terminal 100 through the communication unit 210 so as to be mounted.

The power supply unit 250 is a constituent corresponding to the power supply unit 190 of FIG. 1.

Duplicated description with respect to the constituents corresponding to each other will be omitted.

Figure 3:
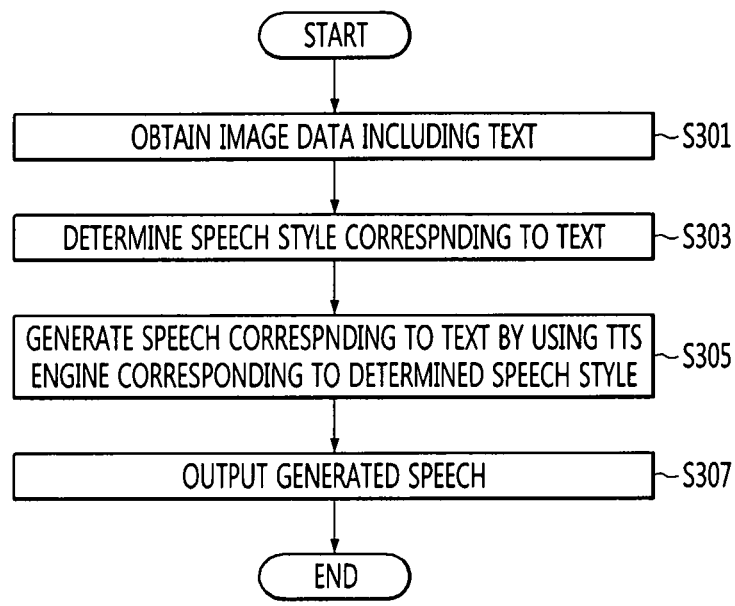
FIG. 3 is a flowchart illustrating a method of mutually converting a text and a speech according to an embodiment of the present invention.

FIG. 3 is a flowchart illustrating a method of mutually converting a text and a speech according to an embodiment of the present invention.

In detail, FIG. 3 illustrates a method of determining a speech style corresponding to an inputted text, converting the text into a speech based on the determined speech style, and outputting the speech.

Referring to FIG. 3, a processor 180 of an artificial intelligence (AI) apparatus 100 obtains image data including a text (S301).

Here, the processor 180 may obtain image data through a camera 121 of an input unit 120.

Here, the processor 180 may obtain image data from an external terminal (not shown) through a wireless communication unit 110. In this case, the image data may be obtained by a camera (not shown) provided in an external terminal (not shown).

The image data may be generated by being photographed by a camera or scanned by a scanner.

The image data may have various formats. For example, the format of the image data may include jpg, jpeg, png, bmp, tif, tiff, and the like.

The image data may include a text, and the text may include a handwritten text, a printed text, a text output through a display device, and the like. That is, the image data may include image data generated by photographing an image output from an electronic device having a display unit such as a TV, a monitor, or a smartphone, or may include image data itself output from the electronic device.

The processor 180 of the artificial intelligence apparatus 100 determines a speech style corresponding to a text (S303).

The processor 180 may adjust the size, resolution, color, format, etc. of the image data as a pre-processing operation in order to use the image data.

If the processor 180 acquires image data having a format that is different from that of image data that the processor 180 can handle, the processor 180 may perform a pre-processing operation of adjusting the size, resolution, color, format, etc. of the image data according to the format of the image data that may be handled.

Hereinafter, the image data may refer to image data, which may be handled by the processor 180, after the pre-processing operation.

The processor 180 may determine a text style of a text included in the image data, and determine a speech style based on the determined text style.

The speech style may mean a style of a speech uttered by a person. By using such a speech style, language information, nationality information, hometown information, emotion information, acoustic environment information, age information, gender information, and the like can be obtained.

For example, the speech style may include a news style of an announcer, a fairy tale style of a speech actor, an entertainment style of a celebrity, and the like, which are listed here for illustrative purposes only, and the present invention is not limited thereto.

The processor 180 may extract at least one text style feature from the image data, and determine a text style or a speech style based on the extracted text style feature.

Here, the processor 180 may determine the text style based on the text style feature, and determine the speech style based on the determined text style.

The text style can be specified according to text style features. Here, if there is a difference even in one text style feature, it may be regarded as indicating a different text style.

The text style feature may include at least one of a language, a text size, a first letter size, an initial consonant size, a font, a color, a pen pressure, a writing speed, an angle, regularity, a horizontal degree, a line spacing, or a letter spacing.

The speech style can be specified according speech style features. Here, if there is a difference even in one speech style feature, it may be regarded as indicating a different speech style.

The speech style feature may include at least one of a tone, a pitch, a speed, an accent, a speech volume, or pronunciation.

Each speech style may be composed of preset speech style features. In this case, each preset speech style can be viewed as a preset for speech style features.

If the text is handwritten, the processor 180 may determine the text creator based on the text style feature, and determine a speech style corresponding to the determined creator.

Here, the text creator may refer to a specific person, such as a registered user, but may refer to a user classification group such as a specific age group or a person having a specific characteristic. The user classification group may be called a style group.

Here, the user classification group may be variously configured according to criteria.

For example, the user classification group configured according to a first criterion may be divided into a children group and an adult group, and the user classification group configured according to a second criterion may be divided into a male group and a female group. The user classification group configured according to the first and second criteria may be divided into a male & children group, a male & adult group, a female & child group, and a female & adult group. These standards are merely examples, and various criteria such as men/women, children/adults, announcers/speech actors/celebrities, etc. may be used.

That is, the processor 180 may determine the text creator by selecting one user from the three users registered for the handwriting, but may also select the text user classification group by determining whether the person who has written the handwriting is a child or an adult to thereby determine the creator.

The memory 170 may store a speech style corresponding to each text creator. In this case, the speech style corresponding to each text creator can be viewed as a preset for the speech style features.

Here, the processor 180 may determine the text creator using the text creator determination model.

The text creator determination model may refer to a model for determining a text creator corresponding to a text style feature when the text style feature is input.

Here, the text creator determination model may be configured of an artificial neural network, and in this case, may be learned using a machine learning algorithm or a deep learning algorithm. In addition, the text creator determination model may be learned from the learning processor 130 of the artificial intelligence apparatus 100 or the learning processor 240 of the learning device 200.

As described above, the text creator determination model may be a model for selecting a creator corresponding to the input text style feature among pre-registered creators (users), or may be a model for selecting a user classification group corresponding to the input text style feature among the user classification groups which are pre-divided.

In addition, after determining the speech style corresponding to the determined creator, the processor 180 may adjust the speech style feature in consideration of the text style feature.

In other words, even the letters of the same person may have different writing speeds, pen pressures, and shapes, depending on the situation. Hence, after determining the creator and determining a speech style corresponding to the determined creator, the processor 180 may adjust the speech style feature in consideration of the text style feature.

For example, if it is determined that the writing the same user was performed in a sleepy state, the processor may adjust the speech style feature to be synthesized as a sleepy style speech corresponding to the user.

In particular, the processor 180 may determine a speech style for each preset unit such as a sentence unit or a word unit in the text included in the image data.

For example, when a particular word has a shape which is different from that of other words, the processor 180 may determine a speech style for the word to be different from the speech style of other words.

The processor 180 of the artificial intelligence apparatus 100 generates a speech corresponding to a text by using a text-to-speech (TTS) engine corresponding to the determined speech style (S305).

The TTS engine may refer to an engine that converts text data into speech data.

The TTS engine may be composed of artificial neural networks, and may be learned using a machine learning algorithm or a deep learning algorithm.

The TTS engine may be directly learned in the learning processor 130 or may be learned and received in the learning processor 240 of the learning device 200.

The memory 170 may store each of TTS engines corresponding to each of the plurality of speech styles.

In this case, each of the TTS engines stored in the memory 170 is a TTS engine that converts a text into a speech having a predetermined speech style feature, and may be viewed as a TTS engine preset.

For example, the memory 170 may store a TTS engine corresponding to a news style of a male/female announcer, a TTS engine corresponding to a fairy tale style of a speech actor, a TTS engine corresponding to an entertainment style of a celebrity, and the like.

In addition, the processor 180 may generate a speech corresponding to the text by using the TTS engine stored in the memory 170.

Here, the processor 180 may select one of the TTS engines stored in the memory 170 based on the determined speech style, adjust the speech style feature of the selected TTS engine, and generate a speech corresponding to the text using the adjusted TTS engine.

For example, when the processor 180 determines the news style of the male announcer as the speech style corresponding to a text, if it is determined that the degree of tilt among the text style features is larger than the preset criterion and the writing is faster than the preset criterion, the processor 180 may increase the (uttering) speed in the TTS engine corresponding to the male announcer news style, and generate a speech corresponding to the text using the speeded-up TTS engine.

For example, when the processor 180 determines the entertainment style of the entertainer as the speech style corresponding to the text, if it is determined that the character size is larger than the preset criteria among the text style features, the processor 180 may increase the (speech) volume in the TTS engine corresponding to the entertainment style of the entertainer, and generate a speech corresponding to the text by using the TTS engine in which the speech volume has been increased.

Alternatively, the processor 180 may adjust the speech style feature for a default TTS engine based on the speech style determined with respect to the default TTS engine stored in the memory 170, and may generate a speech corresponding to the text using the adjusted default TTS engine.

If there is text information on the image data, the processor 180 may generate a speech corresponding to the text using a TTS engine corresponding to the determined speech style without a separate text recognition process.

If there is no text information on the image data, the processor 180 may recognize the text in the image data using a text recognition engine or a text recognition model, and generate a speech corresponding to a text which has been recognized by using the TTS engine corresponding to the determined speech style.

The text recognition model or the text recognition engine refers to a model for recognizing characters in image data.

The text recognition model may be composed of artificial neural networks, and may be learned using a machine learning algorithm or a deep learning algorithm.

The text recognition model may be directly learned in the learning processor 130 or may be learned and received in the learning processor 240 of the learning device 200.

The processor 180 of the artificial intelligence apparatus 100 outputs the generated speech (S307).

Here, the processor 180 may output a speech generated through the sound output unit 152 or the speaker of the output unit 150.

Here, the processor 180 may output the generated speech through the speaker of the external terminal (not shown) by transmitting the generated speech to the external terminal (not shown) through the wireless communication unit 110.

Figure 4:
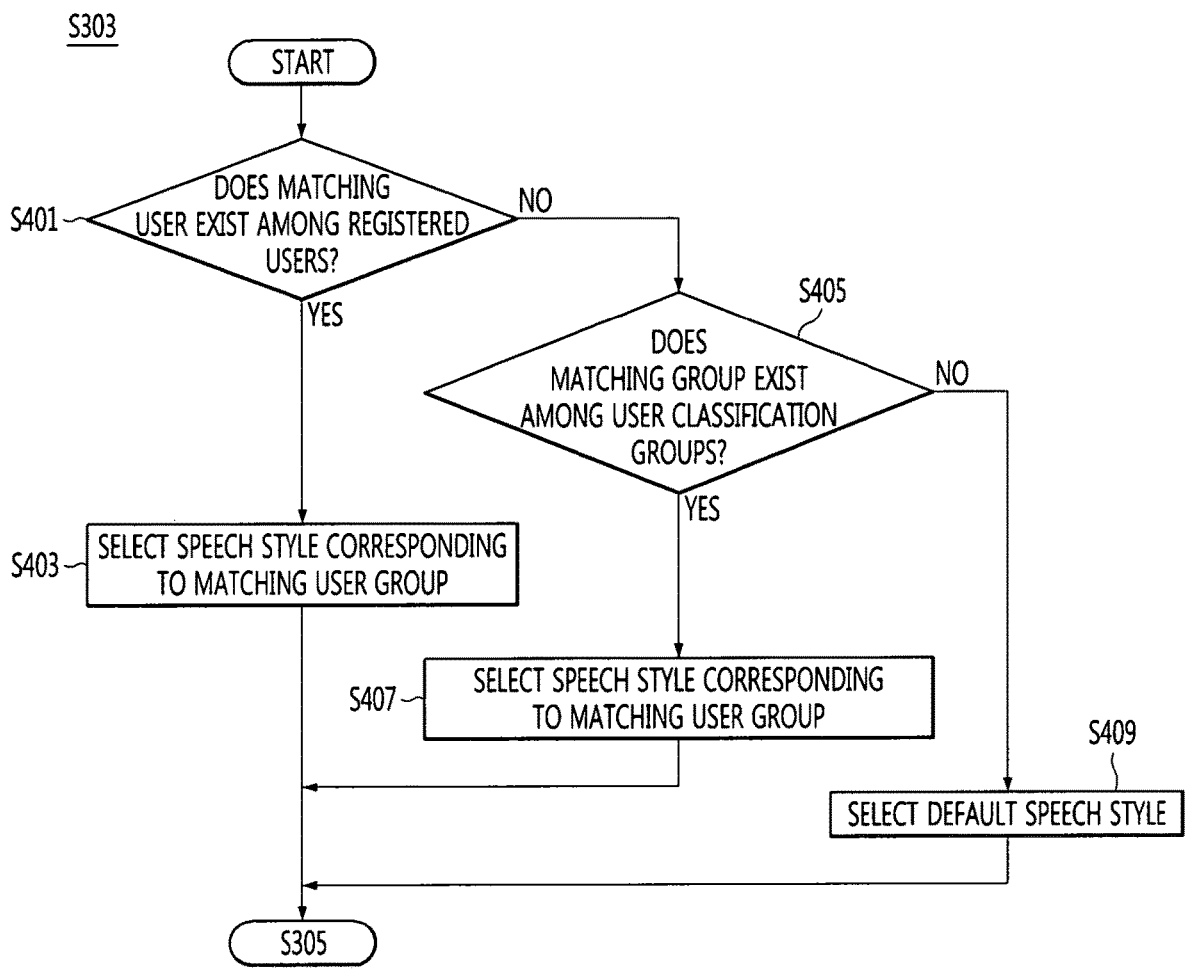
FIG. 4 is a flowchart illustrating an example of a step S303 of determining a speech style corresponding to the text illustrated in FIG. 3.

FIG. 4 is an operation flowchart illustrating an example of a step S303 of determining a speech style corresponding to the text illustrated in FIG. 3.

Referring to FIG. 4, the processor 180 of the artificial intelligence apparatus 100 determines whether there is a matched user among registered users with respect to image data (S401).

For example, in a situation where a married couple is registered as a user, the processor 180 may determine whether a text included in the image data has been written by one of two persons of the married couple.

Determining the creator of the text may be viewed as determining the creator according to the handwriting analysis, but the present invention is not limited thereto.

As described above, the processor 180 may determine whether there is a matched user among registered users with respect to the image data using the text creator determination model.

According to the text creator determination model, when image data itself or text style features extracted from the image data are inputted, the probability or the matching degree that the respective registered users are writers may be outputted as the result of determination. Here, the matching degree may mean a distance to each registered user.

For example, in an example of a situation where a married couple is registered as a user, the text creator determination model may output the probability or matching degree that the husband is the text creator as 80% (0.8) and the probability or the matching degree that the wife is the text creator as 20% (or 0.2).

In addition, the processor 180 may determine whether there is a matching user among registered users based on whether the probability or the matching degree exceeds a predetermined reference value for each registered user.

For example, the processor 180 may determine that the user is a matched user when the probability or matching degree of being the text creator is 80% (or 0.8) or more.

If the matching degree of the plurality of registered users exceeds a preset reference value, the processor 180 may determine the user having the highest matching degree as the matching user.

As a result of the determination in step S401, if there is a matching text creator among the registered users, the processor 180 determines a speech style by selecting a speech style corresponding to the matching user (S403).

The memory 170 stores a speech style corresponding to each registered user, and the processor 180 may select a speech style corresponding to a matching creator or a matching user in the memory 170.

As a result of the determination in step S401, if there is no matching text creator among registered users, the processor 180 determines whether there is a matching group among the user classification groups (S405).

User classification groups may refer to groups that are classified according to some criteria without referring to a specific creator or a specific user.

For example, criteria for distinguishing user classification groups may include male/female, children/adult, announcer/speech actor/celebrity, and the like.

As described above, the processor 180 may determine whether there is a matching user classification group among user classification groups registered or preset for the image data using the text creator determination model.

The text creator determination model may output the matching degree of each user classification group as a result of determination when the image data itself or a text style feature extracted from the image data is input. Here, the matching degree may mean a distance to each user classification group.

For example, in a situation in which the user classification group includes an announcer group, a cartoon character speech actor group, and a comedian group, when the image data is input, the text creator determination model may output the matching degree of the announcer group as 85% (or 0.85), the matching degree of the cartoon character speech actor group as 40% (or 0.4), and the matching degree of the comedian group with 35% (or 0.35).

The processor 180 may determine whether there is a matching user classification group among the user classification groups based on whether the matching degree exceeds the predetermined reference value for the user classification groups.

For example, when the matching degree is 80% (or 0.8) or more, the processor 180 may determine the user classification group as matching user classification group.

If the matching degree of the plurality of user classification groups exceeds a preset reference value, the processor 180 may determine the user classification group having the highest matching degree as the matching user classification group.

For example, the processor 180 may determine the announcer group as a matching group from the user classification group when the image data includes a text of a readable or hard font which is advantageous for delivering information such as news or an article.

As a result of the determination in step S405, if there is a matching group among the user classification groups, the processor 180 determines a speech style by selecting a speech style corresponding to the matching group (S407).

The memory 170 stores a speech style corresponding to each user classification group, and the processor 180 may select a speech style corresponding to a matching group in the memory 170.

As a result of the determination in step S405, if there is no matching group among the user classification groups, the processor 180 selects a default speech style (S409).

The default speech style may mean a speech style default. Since the speech style may be configured by speech style features, the default speech style may mean a speech style composed of default speech style features.

In an embodiment, the processor 180 of the artificial intelligence apparatus 100 determines a speech style by selecting among preset speech styles, and then adjusts a speech style feature for the speech style determined based on the text style feature extracted from the image data.

For example, the processor 180 may determine the speech style by selecting the speech style of the user A if it is determined that the text creator the user A when the image data is input. Further, when the writing speed is larger than a preset reference value in the text style feature acquired from the image data, the (speech) speed may be increased among the speech style features of the user A.

Figure 5:
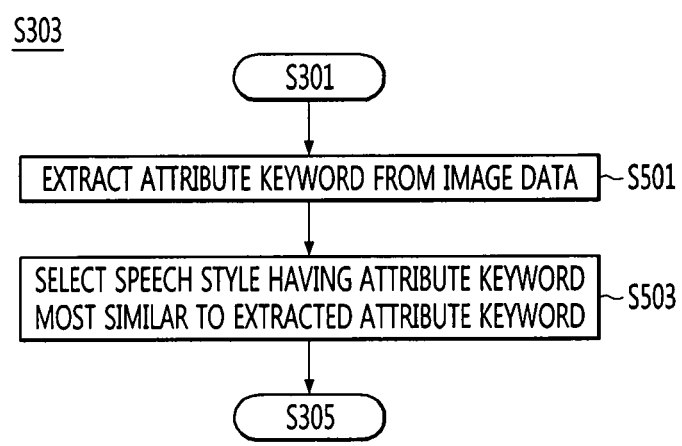
FIG. 5 is a flowchart illustrating an example of a step S303 of determining a speech style corresponding to the text illustrated in FIG. 3.

FIG. 5 is a flowchart illustrating an example of a step S303 of determining a speech style corresponding to the text illustrated in FIG. 3.

Referring to FIG. 5, the processor 180 of the artificial intelligence apparatus 100 extracts at least one attribute keyword from image data (S501).

The attribute keyword is a keyword that can indicate the attribute of the text included in the image data or the sound data, and may include a keyword indicating the mood/feeling of the text or the speech, a keyword indicating the type of the medium/purpose, and the like.

For example, attribute keywords may include warnings, guidance, entertainment magazines, fairy tales, comic books, news, current affairs magazines, etc. as keywords representing the type of media/purpose, and keywords that indicate mood/feeling may include hard, accentuating, important, light, stylish, fashionable, trendy, interesting, cute, funny, neat, and the like.

Here, the processor 180 of the artificial intelligence apparatus 100 may extract the attribute keyword from the image data by using the attribute keyword extraction model.

The attribute keyword extraction model may refer to a model for extracting attribute keywords corresponding to image data in consideration of texts and images included in given image data, and colors or arrangements thereof.

Here, the attribute keyword extraction model may be formed of an artificial neural network, and may be a model which is learned using image data to which the attribute keyword is assigned.

The processor 180 of the artificial intelligence apparatus 100 selects a speech style having an attribute keyword most similar to the extracted attribute keyword (S503).

To this end, the processor 180 of the artificial intelligence apparatus 100 may use a mapping relationship between a speech style and attribute keywords of the speech style, and the mapping relationship may be stored in the memory 170 or the memory 230 of the learning server 200.

Here, the mapping relationship between the speech style and the attribute keyword of the speech style may be generated by mapping the attribute keyword extracted from the sound data with the speech style corresponding to the sound data using the attribute keyword extraction model, or may be generated by extracting the attribute keyword from sound data in which the attribute keyword is given, which is used for the learning of the attribute keyword extraction model, and mapping the attribute keyword with a given attribute keyword.

In an optional embodiment, the processor 180 of the artificial intelligence apparatus 100 selects a speech style group having the attribute keyword most similar to the attribute keyword extracted from the image data, and selects one of the speech styles included in the selected speech style group.

For example, assuming that attribute keywords extracted from image data for the newspaper are "important", "hard", and "neat", and the news group has attribute key words "important", "hard", and "neat" among the speech style groups, when the image data of the newspaper is input, the processor 180 may select the news group as the speech style group, and select one of several speech styles belonging to the news group.

Here, the processor 180 may select one of a plurality of speech styles included in the speech style group, or select a speech style including a speech style feature most similar to or correlated with a text style feature extracted from the image data.

Figure 6:
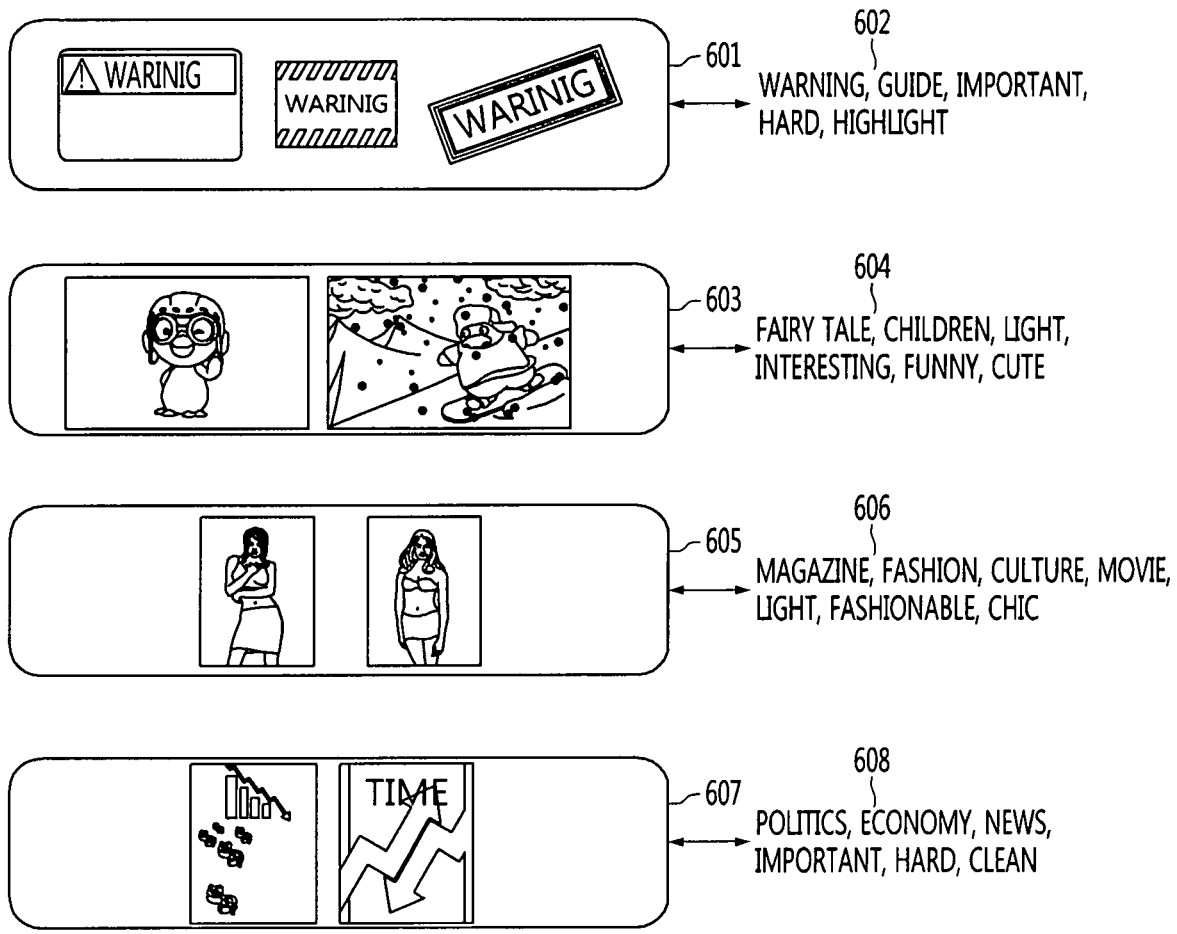
FIG. 6 is a view illustrating an example of a mapping relationship between image data and attribute keywords in an embodiment of the present invention.

FIG. 6 is a view illustrating an example of a mapping relationship between image data and attribute keywords in an embodiment of the present invention.

Referring to FIG. 6, the mapping relationship between the image data 601, 603, 605, or 607 and the attribute keywords 602, 604, 606, or 608 may be determined based on the text, image, arrangement, color, etc. included in the image data.

The mapping relationship between such image data 601, 603, 605 or 607 and attribute keywords 602, 604, 606 or 608 may determine in advance by the user. The determined mapping relationship can then be used to train the attribute keyword extraction model.

That is, the attribute keyword extraction model may be learned according to supervised learning using the learning data labeled with the image data 601, 603, 605, or 607 and the corresponding attribute keywords 602, 604, 606, or 608. The attribute keyword extraction model may be used to extract an attribute keyword corresponding to the image data when it is input. Here, the attribute keyword 602, 604, 606 or 608 may be previously given as a label or set by a user.

For example, the image data 601 corresponding to the warning text may be mapped to attribute keywords 602 such as "warning", "guide", "important", "hard", "highlight" and the like. Image data 603 corresponding to a fairy tale book may be mapped to attribute keywords 604 such as "fairy tales", "children", "light", "interesting", "funny" and "cute". Image data 605 corresponding to an entertainment magazine may be mapped to attribute keywords 606 such as "magazine", "fashion", "culture", "movie", "light", "fashionable", "chic" and the like. Image data 607 corresponding to the current affairs magazine may be mapped to attribute keywords 608 such as politics, economy, news, important, hard, and neat.

If the image data corresponding to the storybook is input using the attribute keyword extraction model, the processor 180 of the artificial intelligence apparatus 100 may extract at least one of "fairy tale", "child", "light", "funny", "funny" and "cute" as the corresponding attribute keyword. The processor 180 may determine the speech style as the speech style of a speech actor of a fairy tale or a cartoon based on the extracted attribute keyword, and convert the text into a speech based on the determined speech style.

Figure 7:
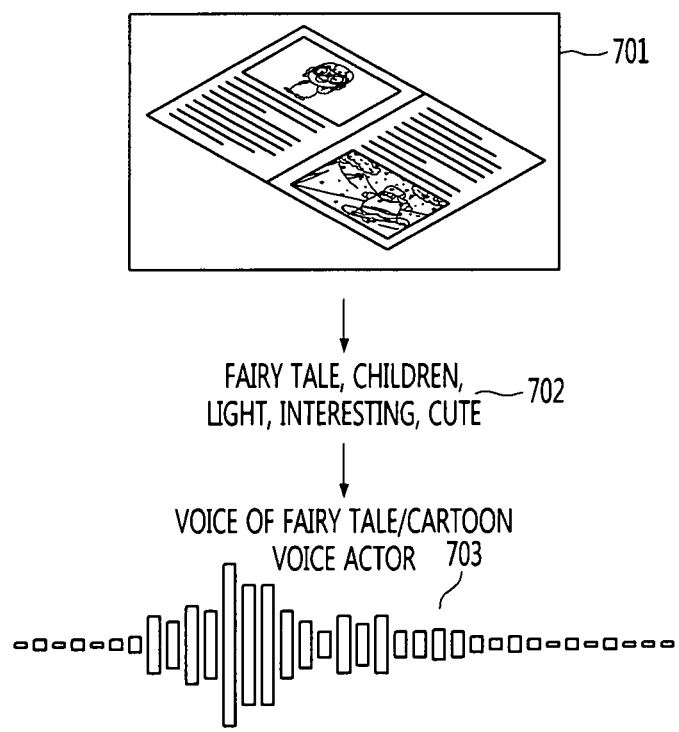
FIG. 7 is a view illustrating an example of converting a text into a speech according to an embodiment of the present invention.

FIG. 7 is a view illustrating an example of converting a text into a speech according to an embodiment of the present invention.

Referring to FIG. 7, when image data 701 corresponding to a fairy tale book is input to the artificial intelligence apparatus 100, the artificial intelligence apparatus 100 may extract attribute keywords 702 such as "Fairy Tale", "Children", "Light", "Funny" and "Cute" from the image data 701 and convert a text included in the image data 701 into a speech 703 of a speech actor of a fairy tale/cartoon based on the extracted attribute keywords 702.

Figure 8:
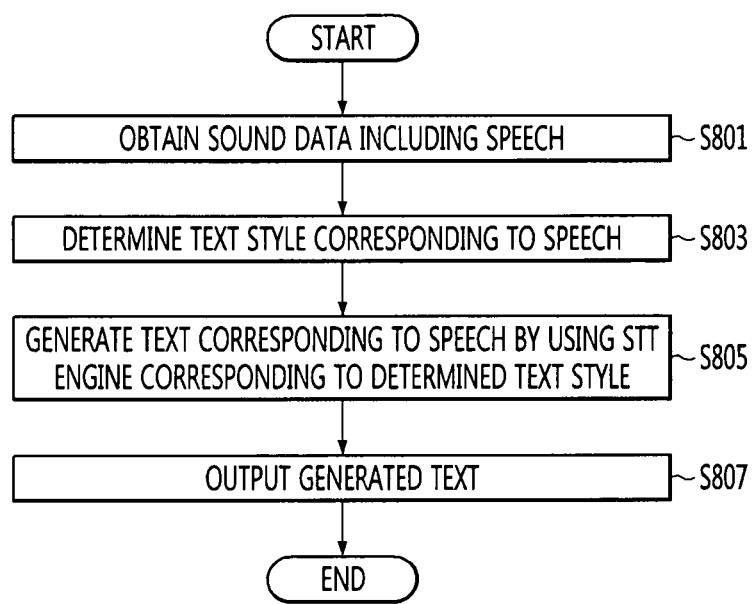
FIG. 8 is a flowchart illustrating a method of mutually converting a text and a speech according to an embodiment of the present invention.

FIG. 8 is a flowchart illustrating a method of mutually converting a text and a speech according to an embodiment of the present invention.

In detail, FIG. 8 illustrates a method of determining a text style corresponding to an inputted speech, converting the speech into a text based on the determined text style, and outputting the text.

Referring to FIG. 8, a processor 180 of an artificial intelligence (AI) apparatus 100 obtains sound data including a speech (S801).

Here, the processor 180 may obtain sound data through the microphone 122 of the input unit 120.

Here, the processor 180 may obtain sound data from an external terminal (not shown) through a wireless communication unit 110. In this case, the sound data may be obtained by a microphone (not shown) provided in an external terminal (not shown).

The sound data may have various formats. For example, the format of the sound data may include wav, mp3, mp4, acc, and the like.

The sound data may include a speech, and the speech may include a speech directly spoken by a user, a speech output from a sound output device, and the like. That is, the sound data may include sound data generated by recording sounds output from an electronic device having a sound output unit such as a TV, a speaker, a radio, or a smartphone, or may include sound data itself output from the electronic device.

The processor 180 of the artificial intelligence device 100 determines a text style corresponding to the speech (S803).

The processor 180 may adjust the volume, resolution, format, etc. of the sound data as a preprocessing operation in order to use the sound data.

If the processor 180 acquires image data having a format that is different from that of sound data that the processor 180 can handle, the processor 180 may perform a pre-processing operation of adjusting the volume, resolution, format, etc. of the sound data according to the format of the sound data that may be handled.

Hereinafter, the sound data may refer to sound data, which may be handled by the processor 180, after the pre-processing operation.

The processor 180 may determine a speech style for the speech included in the sound data, and determine a text style based on the determined speech style.

The processor 180 may extract at least one speech style feature from the sound data, and determine a text style or speech style based on the extracted speech style feature.

Here, the processor 180 may determine the speech style based on the speech style feature, and determine the text style based on the determined speech style.

Each text style may be composed of preset text style features. In this case, each preset text style can be viewed as a preset for text style features.

The processor 180 may determine a speaker based on the speech style feature, and determine a text style corresponding to the determined speaker.

Here, the speaker may refer to a specific person, such as a registered user, but may refer to a user classification group such as a specific age group or a person having a specific characteristic.

The description of the user classification group is the same as that described with reference to FIG. 3.

That is, the processor 180 may select one user from among three users registered for the speech to determine the speaker, but may also determine whether the person who uttered the speech is a child or an adult to determine the speaker by selecting the speech user classification group.

The memory 170 may store a text style corresponding to each speaker. In this case, the text style corresponding to each speaker can be viewed as a preset for text style features.

Here, the processor 180 may determine the speaker using the speaker determination model.

The speaker determination model may mean a model for determining a speaker corresponding to the speech style feature when the speech style feature is input.

Here, the speaker determination model may be configured of an artificial neural network, and in this case, may be learned using a machine learning algorithm or a deep learning algorithm. In addition, the speaker determination model may be learned from the learning processor 130 of the artificial intelligence apparatus 100 or the learning processor 240 of the learning device 200.

As described above, the speaker determination model may be a model for selecting a creator corresponding to the input speech style feature among pre-registered creators (users), or may be a model for selecting a user classification group corresponding to the input speech style feature among the user classification groups which are pre-divided.

In addition, after determining the text style corresponding to the determined speaker, the processor 180 may adjust the text style feature in consideration of the speech style feature.

In other words, even the speech of the same person may have different uttering speed, volume, and pronunciation, depending on the situation and accordingly show a different speech style Therefore, after determining the speaker and determining the text style corresponding to the determined speaker, the processor 180 may adjust the text style feature in consideration of the speech style feature.

For example, even if the speech of the same user is determined to have been spoken in a sleepy state, the processor may adjust the text style feature so that the text corresponding to the user can be synthesized into irregular and distorted letters, such as written in a sleepy state.

In particular, the processor 180 may determine a text style for each preset unit such as a sentence unit or a word unit in the speech included in the sound data.

For example, when a particular word has a pronunciation which is different from that of other words, the processor 180 may determine a text style for the word to be different from the text style of other words.

The processor 180 of the artificial intelligence apparatus 100 generates a text corresponding to a speech using a speech-to-text (STT) engine corresponding to the determined text style (S805).

The STT engine may refer to an engine that converts speech data into text data.

The STT engine may be composed of artificial neural networks, and may be learned using a machine learning algorithm or a deep learning algorithm.

The STT engine may be directly learned in the learning processor 130 or may be learned and received in the learning processor 240 of the learning device 200.

The memory 170 may store each of STT engines corresponding to each of the plurality of text styles.

In this case, each of the STT engines stored in the memory 170 is a STT engine that converts a speech into a text having a predetermined text style feature, and may be viewed as a STT engine preset.

For example, the memory 170 may store an STT engine corresponding to a news style, an STT engine corresponding to a cartoon/fairy style, an STT engine corresponding to an entertainment style, and the like.

In addition, the processor 180 may generate a text corresponding to the speech using the STT engine stored in the memory 170.

Here, the processor 180 may select one of the STT engines stored in the memory 170 based on the determined text style, adjust the text style feature of the selected STT engine, and generate a text corresponding to the speech using the adjusted STT engine.

For example, when the processor 180 determines the news style as the speech style corresponding to the text, if it is determined that the uttering speed is larger than the preset criterion among the speech style features, the processor 180 may adjust the text tilt angle to indicate that the writing is fast in the STT engine corresponding to the news style, and may generate a text corresponding to the speech using the STT engine with the text tilt angle increased.

For example, when the processor 180 determines the entertainment style as the text style corresponding to the speech, if it is determined that the volume is larger than the preset criteria among the speech style features, the processor 180 may increase the character size in the STT engine corresponding to the entertainment style, and generate a text corresponding to the speech by using the STT engine in which the character size has been increased.

Alternatively, the processor 180 may adjust the text style feature for a default STT engine based on the text style determined with respect to the default STT engine stored in the memory 170, and may generate a text corresponding to the speech using the adjusted default STT engine.

In particular, when the speech 180 is converted into a text, the processor 180 may convert the speech into the form of a text handwriting animation as if a person directly writes the converted text.

Here, in the case that the processor 180 converts the speech into the form of the text handwriting animation, the text style attribute may include the style attribute of the text handwriting animation. In this case, the writing speed or the writing stroke order may be included in the text style attribute.

For example, when the processor 180 determines the news style as the speech style corresponding to the text, if it is determined that the uttering speed is larger than the preset criterion among the speech style features, the processor 180 may increase the writing speed in the STT engine corresponding to the news style, and generate a text writing animation corresponding to the speech by using the STT engine in which the writing speed has been increased.

In the following, text may be used as a term including text handwriting animation.

If there is speech information on the sound data, the processor 180 may generate a text corresponding to the speech using an STT engine corresponding to the determined text style without a separate speech recognition process.

If there is no speech information about the text data, the processor 180 may recognize the speech from the sound data using a speech recognition engine or a speech recognition model, and generate a text corresponding to the recognized speech using the STT engine corresponding to the determined text style.

The speech recognition model or speech recognition engine refers to a model for recognizing a speech in sound data.

The speech recognition model may be composed of artificial neural networks, and may be learned using a machine learning algorithm or a deep learning algorithm.

The speech recognition model may be directly learned in the learning processor 130 or may be learned and received in the learning processor 240 of the learning device 200.

The processor 180 of the artificial intelligence apparatus 100 outputs the generated text (S807).

Here, the processor 180 may output the text generated through the display unit 151 of the output unit 150.

Here, the processor 180 may output the generated text through the display unit of the external terminal (not shown) by transmitting the generated text to the external terminal (not shown) through the wireless communication unit 110.

Here, outputting the text may include not only outputting the converted text directly without animation, but also sequentially outputting texts generated by including time-series elements such as the text handwriting animation described above.

For example, when a text of three sentences are generated, the processor 180 may output three sentences at the same time, sequentially output by a predetermined unit such as a sentence or a word, or output the sentences in the form of a handwriting animation such as actually writing each letter.

Figure 9:
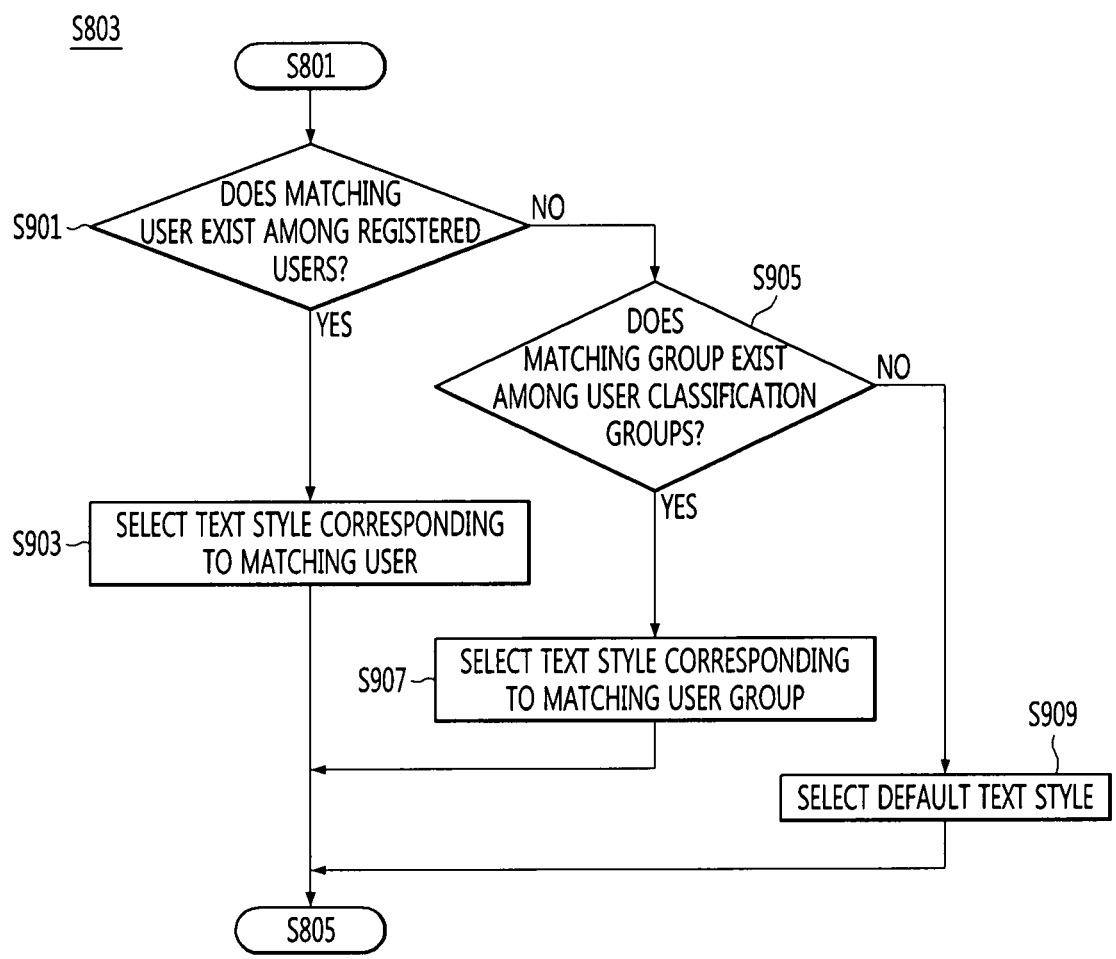
FIG. 9 is a flowchart illustrating an example of a step S803 of determining a text style corresponding to the speech illustrated in FIG. 8.

FIG. 9 is a flowchart illustrating an example of a step S803 of determining a text style corresponding to the speech illustrated in FIG. 8.

Referring to FIG. 9, the processor 180 of the artificial intelligence apparatus 100 determines whether there is a matched user among registered users with respect to sound data (S901).

For example, in a situation where a married couple is registered as a user, the processor 180 may determine whether a speech included in the sound data has been uttered by one of two persons of the married couple.

Determining the speaker may be viewed as determining the speaker according to the speech analysis, but the present invention is not limited thereto.

As described above, the processor 180 may determine whether there is a matched user among registered users with respect to the sound data using the speaker determination model.

According to the speaker determination model, when sound data itself or speech style features extracted from the sound data are inputted, the probability or the matching degree that the respective registered users are speakers may be outputted as the result of determination. Here, the matching degree may mean a distance to each registered user.

For example, in an example of a situation where a married couple is registered as a user, when sound data is inputted, the speaker determination model may output the probability or matching degree that the husband is the speaker as 80%

(0.8) and the probability or the matching degree that the wife is the speaker as 20% (or 0.2).

In addition, the processor 180 may determine whether there is a matching user among registered users based on whether the probability or the matching degree exceeds a predetermined reference value for each registered user.

For example, the processor 180 may determine that the user is a matched user when the probability or matching degree of being the speaker is 80% (or 0.8) or more.

If the matching degree of the plurality of registered users exceeds a preset reference value, the processor 180 may determine the user having the highest matching degree as the matching user.

As a result of the determination in step S901, if there is a matching speaker among the registered users, the processor 180 determines a text style by selecting a text style corresponding to the matching user (S903).

The memory 170 stores a text style corresponding to each registered user, and the processor 180 may select a text style corresponding to a matching speaker or a matching user in the memory 170.

As a result of the determination in step S901, if there is no matching speaker among registered users, the processor 180 determines whether there is a matching group among the user classification groups (S905).

User classification groups may refer to groups that are classified according to some criteria without referring to a specific creator or a specific user.

For example, criteria for distinguishing user classification groups may include male/female, children/adult, news/cartoon/entertainment, and the like.

As described above, the processor 180 may determine whether there is a matching user classification group among user classification groups registered or preset for the sound data using the speaker determination model.

According to the speaker determination model, when sound data itself or speech style features extracted from the sound data are inputted, the probability or the matching degree of each user classification group may be outputted as the result of determination. Here, the matching degree may mean a distance to each user classification group.

For example, in a situation in which the user classification group includes a news group, a cartoon group, and an entertainment group, when the sound data is input, the speaker determination model may output the matching degree of the news group as 85% (or 0.85), the matching degree of the cartoon group as 40% (or 0.4), and the matching degree of the entertainment group with 35% (or 0.35).

The processor 180 may determine whether there is a matching user classification group among the user classification groups based on whether the matching degree exceeds the predetermined reference value for the user classification groups.

For example, when the matching degree is 80% (or 0.8) or more, the processor 180 may determine the user classification group as matching user classification group.

If the matching degree of the plurality of user classification groups exceeds a preset reference value, the processor 180 may determine the user classification group having the highest matching degree as the matching user classification group.

For example, the processor 180 may determine the news group as a matching group from the user classification group when the sound data includes a speech of a hard and clean style which is advantageous for delivering information like an announcer.

As a result of the determination in step S905, if there is a matching group among the user classification groups, the processor 180 determines a text style by selecting a text style corresponding to the matching group (S907).

The memory 170 stores a text style corresponding to each user classification group, and the processor 180 may select a text style corresponding to a matching group in the memory 170.

As a result of the determination in step S905, if there is no matching group among the user classification groups, the processor 180 selects a default text style (S909).

The default text style may mean a text style default.

Since the text style may be configured by text style features, the default text style may mean a text style composed of default text style features.

In an embodiment, the processor 180 of the artificial intelligence apparatus 100 determines a text style by selecting among preset text styles, and then adjusts a text style feature for the text style determined based on the speech style feature extracted from the sound data.

For example, the processor 180 may determine the text style by selecting the text style of the user A if it is determined that the speaker is the user A when the sound data is input. Further, when the speaking speed is larger than a preset reference value in the speech style feature acquired from the sound data, the writing speed may be increased among the text style features of the user A.

Figure 10:
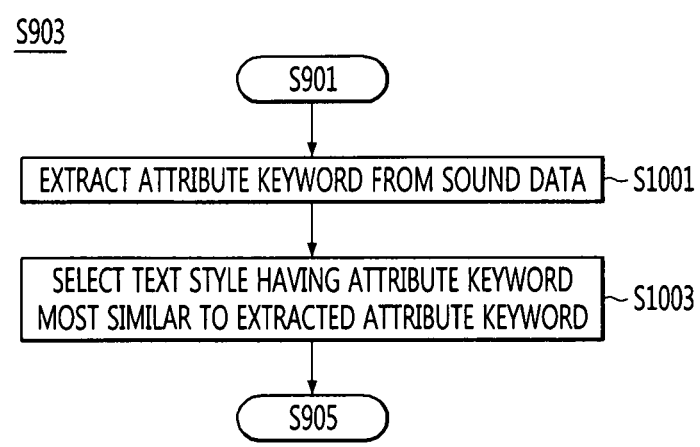
FIG. 10 is a flowchart illustrating an example of a step S803 of determining a text style corresponding to the speech illustrated in FIG. 8.

FIG. 10 is a flowchart illustrating an example of a step S803 of determining a text style corresponding to the speech illustrated in FIG. 8.

Referring to FIG. 10, the processor 180 of the artificial intelligence apparatus 100 extracts at least one attribute keyword from sound data (S1001).

The attribute keyword is a keyword that can indicate the attribute of the text included in the image data or the sound data, and may include a keyword indicating the mood/feeling of the text or the speech, a keyword indicating the type of the medium/purpose, and the like.

The description of the attribute keyword is the same as that described with reference to FIG. 5.

Here, the processor 180 of the artificial intelligence apparatus 100 may extract the attribute keyword from the sound data by using the attribute keyword extraction model.

The processor 180 of the artificial intelligence apparatus 100 selects a text style having an attribute keyword most similar to the extracted attribute keyword (S1003).

To this end, the processor 180 of the artificial intelligence apparatus 100 may use a mapping relationship between a text style and attribute keywords of the text style, and the mapping relationship may be stored in the memory 170 or the memory 230 of the learning server 200.

Here, the mapping relationship between the text style and the attribute keyword of the text style may be generated by mapping the attribute keyword extracted from the image data with the text style corresponding to the image data using the attribute keyword extraction model, or may be generated by extracting the attribute keyword from image data in which the attribute keyword is given, which is used for the learning of the attribute keyword extraction model, and mapping the attribute keyword with a given attribute keyword.

In an optional embodiment, the processor 180 of the artificial intelligence apparatus 100 selects a text style group having the attribute keyword most similar to the attribute keyword extracted from the sound data, and selects one of the text styles included in the selected text style group.

For example, assuming that attribute keywords extracted from sound data for a news are "important", "hard", and "neat", and the news group has attribute key words "important", "hard", and "neat" among the text style groups, when the sound data of the news is input, the processor 180 may select the news group as the text style group, and select one of several text styles belonging to the news group.

Here, the processor 180 may select one of a plurality of text styles included in the text style group, or select a text style including a text style feature most similar to or correlated with a speech style feature extracted from the sound data.

Figure 11:
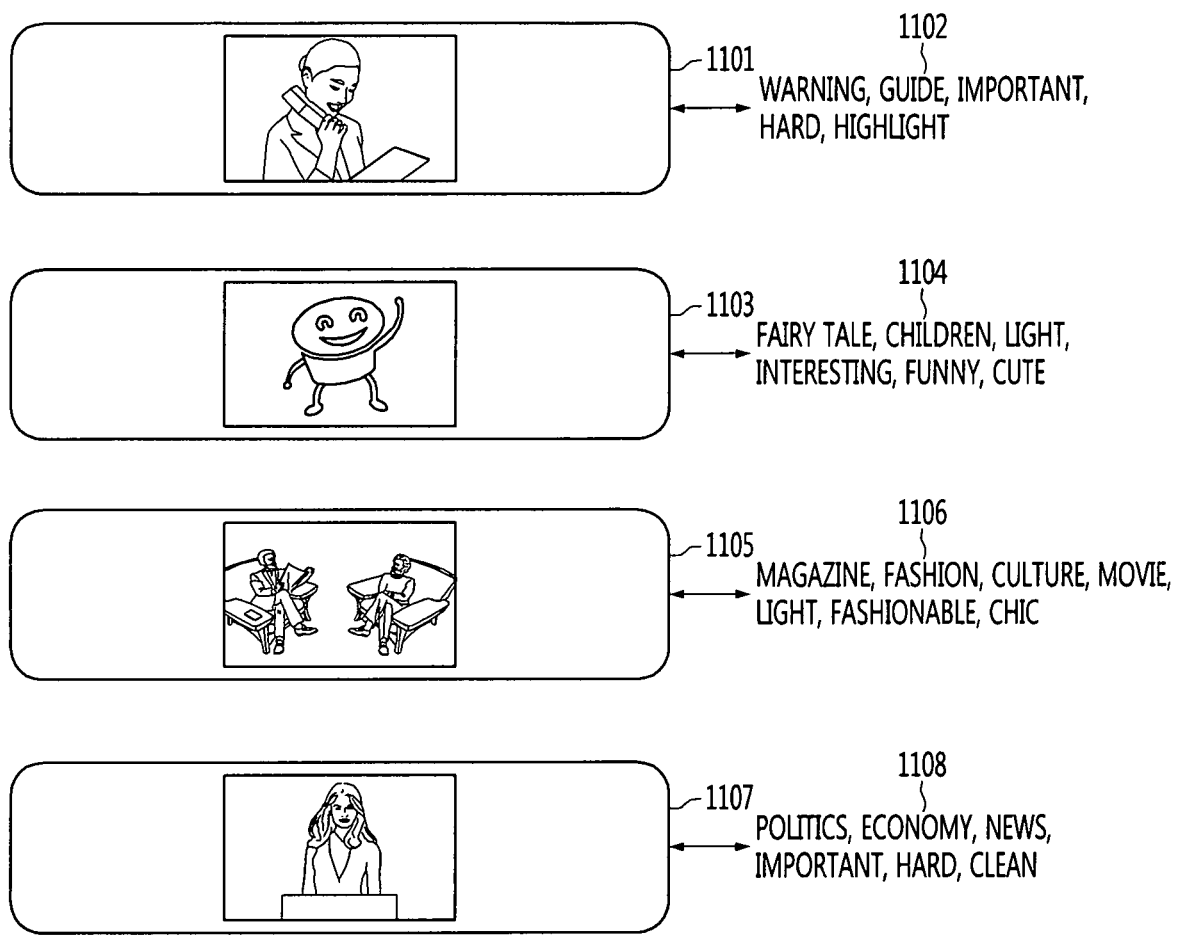
FIG. 11 is a view illustrating an example of a mapping relationship between sound data and attribute keywords in an embodiment of the present invention.

FIG. 11 is a view illustrating an example of a mapping relationship between sound data and attribute keywords in an embodiment of the present invention.

Referring to FIG. 11, the mapping relationship between the sound data 1101, 1103, 1105, or 1107 and the attribute keywords 1102, 1104, 1106, or 1108 may be determined based on the pronunciation, tone, pitch, volume, etc. included in the sound data.

The mapping relationship between such sound data 1101, 1103, 1105 or 1107 and attribute keywords 1102, 1104, 1106 or 1108 may be determined in advance by the user. The determined mapping relationship can then be used to train the attribute keyword extraction model.

That is, the attribute keyword extraction model may be learned according to supervised learning using the learning data labeled with the sound data 1101, 1103, 1105, or 1107 and the corresponding attribute keywords 1102, 1104, 1106, or 1108. The attribute keyword extraction model may be used to extract an attribute keyword corresponding to the sound data when it is input. Here, the attribute keyword 1102, 1104, 1106 or 1108 may be previously given as a label or set by a user.

For example, the sound data 1101 corresponding to the announcement may be mapped to attribute keywords 1102 such as "warning", "guide", "important", "hard", "highlight" and the like. Sound data 1103 corresponding to a cartoon may be mapped to attribute keywords 1104 such as "fairy tales", "children", "light", "interesting", "funny" and "cute". Sound data 1105 corresponding to an entertainment broadcast may be mapped to attribute keywords 1106 such as "magazine", "fashion", "culture", "movie", "light", "fashionable", "chic" and the like. Sound data 1107 corresponding to the news may be mapped to attribute keywords 1108 such as politics, economy, news, important, hard, and neat.

If the sound data corresponding to the cartoon is input using the attribute keyword extraction model, the processor 180 of the artificial intelligence apparatus 100 may extract at least one of "fairy tale", "child", "light", "funny", "funny" and "cute" as the corresponding attribute keyword. The processor 180 may determine the text style as the text style of the fairy tale or the cartoon based on the extracted attribute keyword, and convert the speech into a text based on the determined text style.

Figure 12:
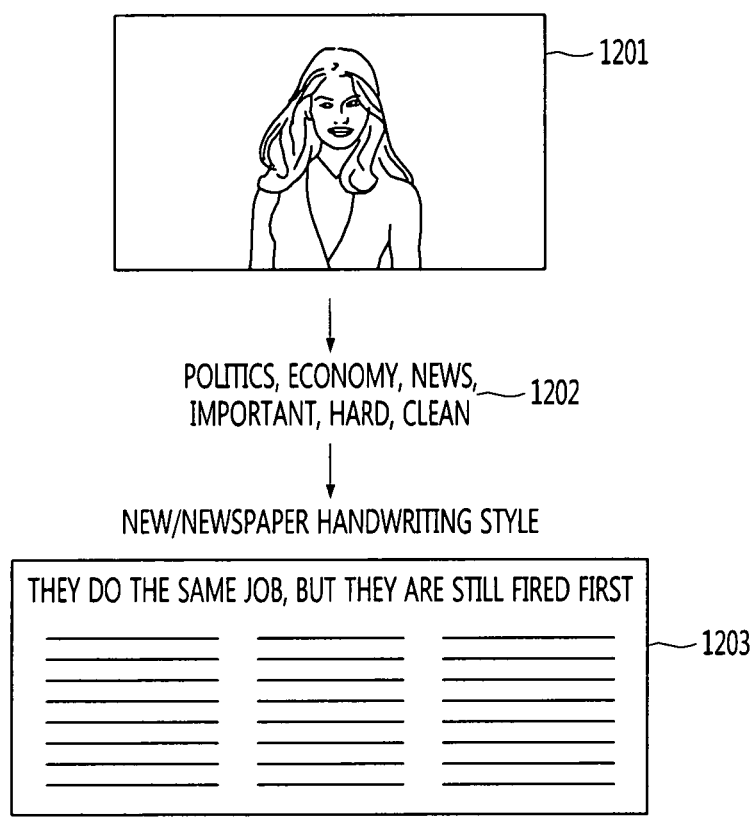
FIG. 12 is a view illustrating an example of converting a speech into a text according to an embodiment of the present invention.

FIG. 12 is a view illustrating an example of converting a speech into a text according to an embodiment of the present invention.

Referring to FIG. 12, when sound data 1201 corresponding to a news is input to the artificial intelligence apparatus 100, the artificial intelligence apparatus 100 may extract attribute keywords 1202 such as "politics", "economy", "news", "important", "hard", "clean", etc. and convert a speech included in the sound data 1201 into a text 1203 of a of a news/newspaper style based on the extracted attribute keywords 1202.

Figure 13:
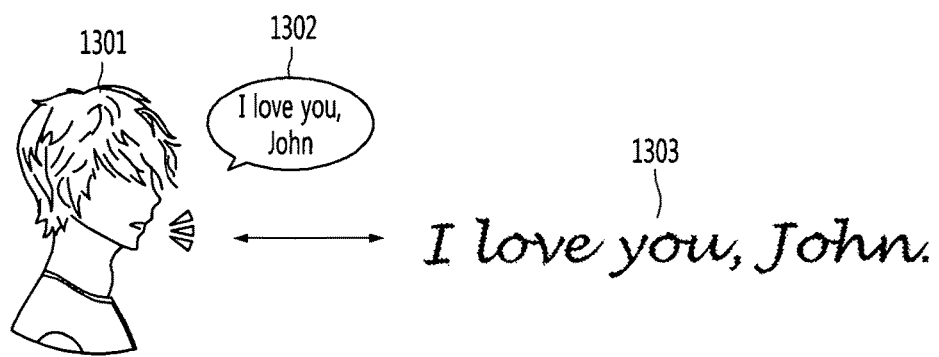
FIG. 13 is a view illustrating an example of mutually converting a text and a speech in consideration of a user according to an embodiment of the present invention.
Figure 13:
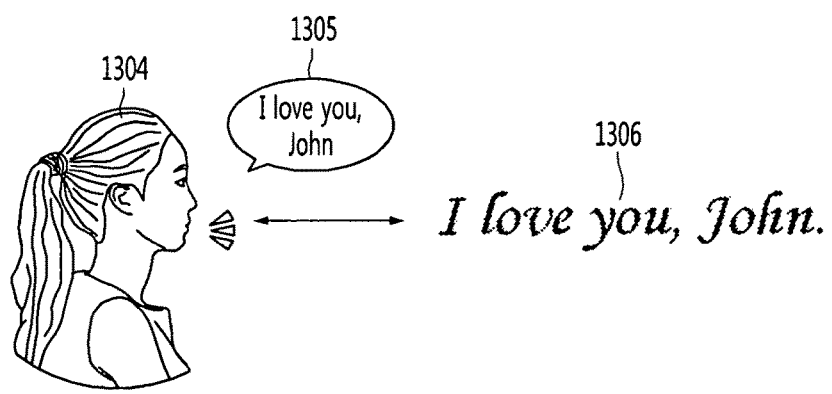

FIG. 13 is a view illustrating an example of mutually converting a text and a speech in consideration of a user according to an embodiment of the present invention.

Referring to FIG. 13, the artificial intelligence apparatus 100 may mutually convert a text and a speech for a registered user based on a text style and a speech style of the registered user.

Assuming that a couple is both registered users of the artificial intelligence apparatus 100, when the processor 180 of the artificial intelligence apparatus 100 obtains sound data including a speech "I love you, John" 1302 uttered by the voice of the registered husband, the processor 180 matches the obtained sound data with the text style of the husband 1301 and generates image data including a text "I love you, John" 1303 which is written in a handwriting style based on the text style of the registered husband 1301. Further, when the processor 180 of the artificial intelligence apparatus 100 obtains sound data including a speech "I love you, John" 1305 uttered by the voice of the registered wife, the processor 180 matches the obtained sound data with the text style of the wife 1304 and generates image data including a text "I love you, John" 1306 which is written in a handwriting style based on the text style of the registered wife 1304.

In the above assumption, when the processor 180 of the artificial intelligence apparatus 100 obtains image data including a text "I love you, John" 1303 written in a handwriting style of the husband 1301, the processor 180 matches the obtained image data with the speech style of the husband 1301 and generates speech data including a speech "I love you, John" 1302 based on the speech style of the registered husband 1301. Further, when the processor 180 of the artificial intelligence apparatus 100 obtains image data including a text "I love you, John" 1306 written in a handwriting style of the wife 1304, the processor 180 matches the obtained image data with the speech style of the wife 1304 and generates speech data including a speech "I love you, John" 1305 based on the speech style of the registered wife 1304.

As such, the artificial intelligence apparatus 100 according to an embodiment of the present invention may be used to read a memo written in handwriting in the writer's speech style or convert the speech memo into the speaker's handwriting style and output it.

Figure 14:
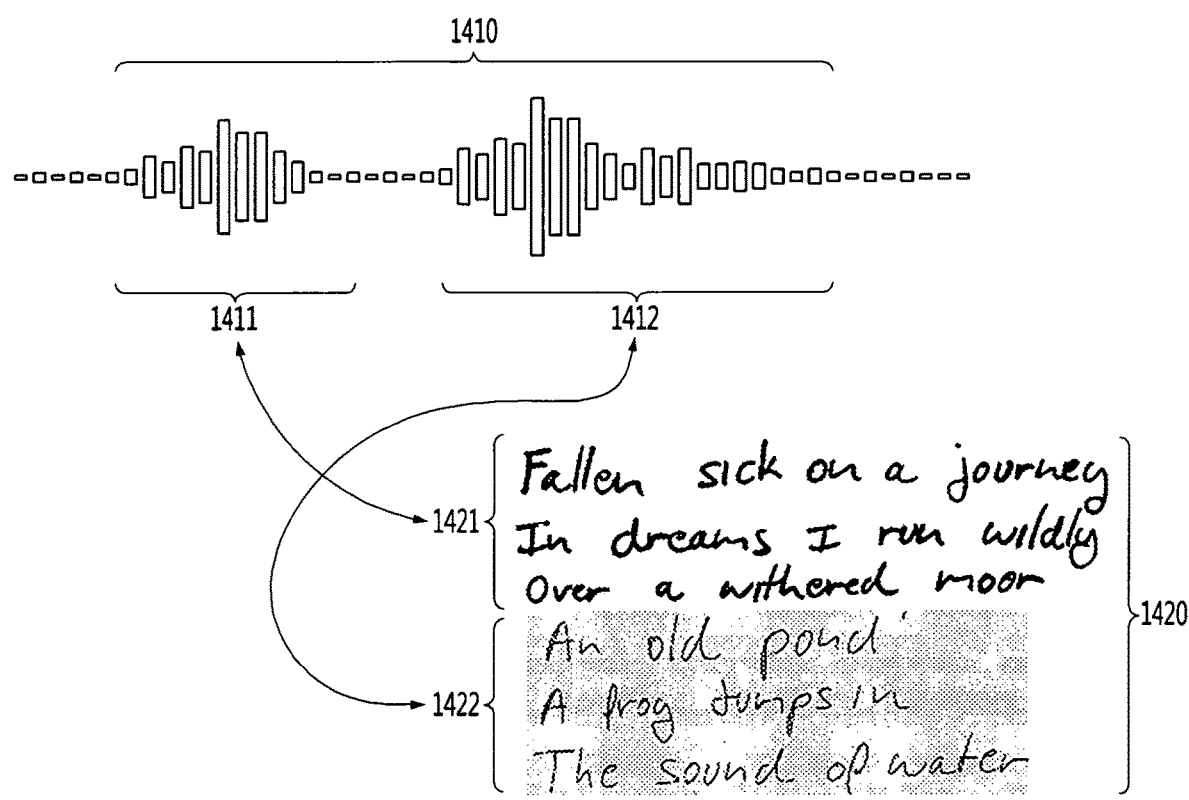
FIG. 14 is a view illustrating an example of mutually converting a text and a speech in consideration of a user according to an embodiment of the present invention.

FIG. 14 is a view illustrating an example of mutually converting a text and a speech in consideration of a user according to an embodiment of the present invention.

Figure 15:
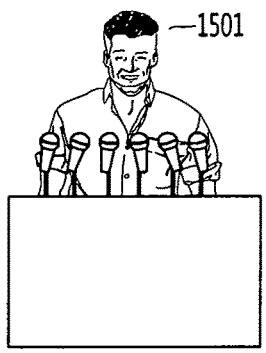
FIG. 15 is a view illustrating an example of mutually converting a text and a speech according to an embodiment of the present invention.
Figure 15:
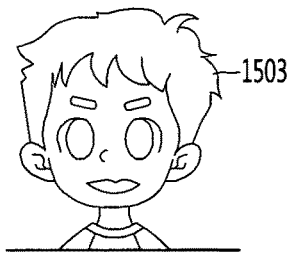
Figure 15:
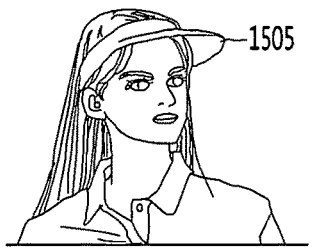

Referring to FIG. 15, the processor 180 of artificial intelligence apparatus 100 may mutually convert a text and a speech based on a text style and a speech style.

Assuming that the sound data including a speech 1410 includes a first speech 1411 spoken by a first user and a second speech 1412 spoken by a second user, the processor 180 of the artificial intelligence apparatus 100 may generate a first text 1421 in a handwriting based on the text style of the first user by matching the first speech 1411 with the text style of the first user and generate a second text in a handwriting based on the text style of the second user by matching the second speech 1412 with the text style of the second user, to thereby generate a text 1420 including the first text 1421 and the second text 1420 and generate image data including the text 1420.

Likewise, assuming that image data including the text 1420 includes the first text 1421 written by the first user and the second speech 1422 recorded by the second user, the processor 180 of the artificial intelligence apparatus 100 may generate a first speech 1411 using a voice based on the speech style of the first user by matching the first text 1421 to the speech style of the first user and generate a second speech 1412 using a voice based on the speech style of the second user by matching the second text 1422 to the speech style of the second user, to thereby generate a speech including the first speech 1411 and the second speech 1412 and generate sound data including the speech 1410.

As described above, the artificial intelligence apparatus 100 according to an embodiment of the present invention may output speech memos, call logs, and conference recordings by a plurality of speakers as texts for each speaker, or texts of different handwriting styles may be used to be converted into speeches uttered by different speakers.

As described above, the processor 180 of the artificial intelligence apparatus 100 may mutually convert a speech and a text by using the registered user's speech style or text style, but may also mutually convert a speech and a text by using the speech style or text style for each user classification group.

However, even in the case that the processor 180 of the artificial intelligence apparatus 100 cannot determine a corresponding registered user or a user classification group, if the voice of the speech is different for each section or the handwriting of the text is different for each section, the processor 180 can convert the speech or the text in a differentiated manner by using different speech styles or text styles.

In addition, after determining a registered user or a user classification group corresponding to the acquired image data or sound data, the processor 180 of the artificial intelligence apparatus 100 may adjust the feature of the style to be used for conversion based on the style feature of the obtained data.

That is, when the processor 180 of the artificial intelligence apparatus 100 acquires image data including a text, the processor 180 determines a registered user matching the acquired image data, selects a speech style corresponding to the determined user, adjust the selected speech style based on the text style feature of the acquired image data, and convert the text included in the acquired image data into a speech based on the adjusted speech style.

For example, in speeches of the same registered user, a speech, which has been uttered in a sleepy state would be different from a speech in a normal state in the speech style features. For example, the tone of the speech in a sleepy state may be low and the pronunciation may not be clear. Accordingly, the processor 180 of the artificial intelligence apparatus 100 may convert a speech into a text by adjusting the selected (or determined) text style based on the speech style feature of the sound data. Accordingly, the text converted from the speech uttered in the sleepy state may be irregular in shape and distorted as compared to the text converted from the speech uttered in the normal state.

Likewise, when the processor 180 of the artificial intelligence apparatus 100 acquires sound data including a speech, the processor 180 determines a registered user matching the acquired sound data, selects a text style corresponding to the determined user, adjust the selected text style based on the speech style feature of the acquired sound data, and convert the speech included in the acquired sound data into a speech based on the adjusted speech style.

For example, a text written by a user in a sleepy state may be irregular in shape and distorted as compared to a text written by the same user in a normal state. Accordingly, the processor 180 of the artificial intelligence apparatus 100 may convert a text into a speech by adjusting the selected (or determined) speech style based on the text style feature of the image data. As such, a speech, which is generated by converting a text handwritten in a sleepy state, may be low in its tone and unclear in its pronunciation compared to a speech which is generated by converting a text handwritten in a normal state.

In addition, for example, the processor 180 of the artificial intelligence apparatus 100 may convert a quickly-uttered speech of a user into a text of a cursive style compared to a normally-uttered speech of the same user. In the same manner, the processor 180 may convert a text of a cursive style of a user into a quickly-uttered speech compared to a text of a normal style of the same user.

As such, the artificial intelligence apparatus 100 according to an embodiment of the present disclosure may adjust the determined user's speech style or the determined user's text style based on the acquired speech style of the sound data or the acquired text style of the image data to thereby reflect the situation at the time of utterance or the situation at the time of writing.

Here, the utterance situation or the writing situation may be reflected in the above-described attribute keyword.

FIG. 15 is a view illustrating an example of mutually converting a text and a speech according to an embodiment of the present invention.

Referring to FIG. 15, the artificial intelligence apparatus 100 may mutually convert a text and a speech based on a text style and a speech style.

For example, the processor 180 may mutually convert a speech 1501 having a clean and hard pronunciation and a text 1502 of a clean and hard style, such as the moderator's speech. As described above, the portion highlighted in the uttered speech and the portion highlighted in the text may be converted to correspond to each other.

In addition, the processor 180 may mutually convert a speech 1503 having a high tone and an incorrect pronunciation, such as a child's speech, and a text 1504 having an irregular and cute style.

In addition, the processor 180 may mutually convert a speech 1505 that is rapidly spoken and a text 1506 that has a sense of speed.

Figure 16:
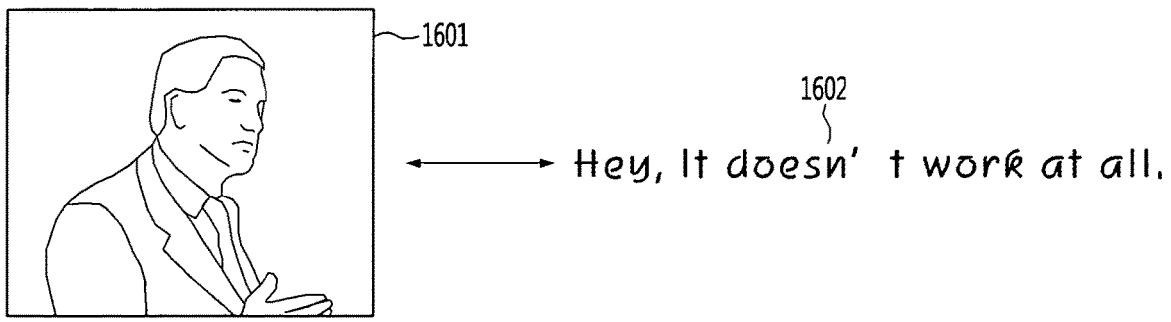
FIG. 16 is a view illustrating an example of mutually converting a text and a speech according to an embodiment of the present invention.
Figure 16:
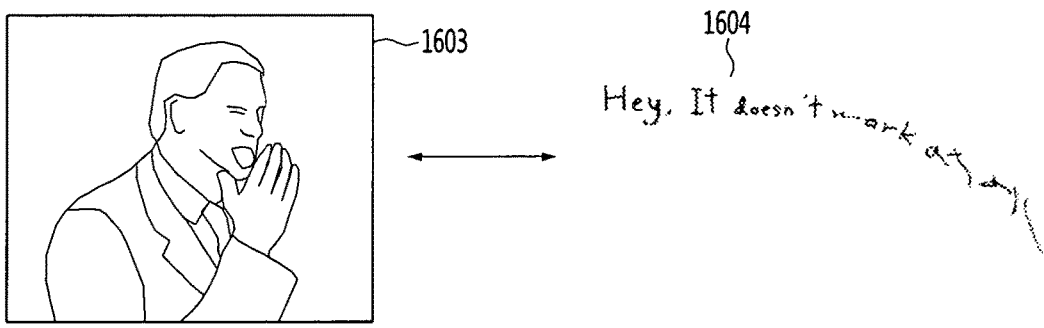

FIG. 16 is a view illustrating an example of mutually converting a text and a speech according to an embodiment of the present invention.

Referring to FIG. 16, the artificial intelligence apparatus 100 may mutually convert a text and a speech by mapping speech style features with text style features.

As described above, the speech style feature may reflect the situation at the time of speech utterance, and the text style feature may reflect the situation at the time of text writing.

For example, the processor 180 may mutually convert a speech 1601 spoken in a sleepy state and a text 1602 in a uniform and clean shape.

On the other hand, the processor 180 may mutually convert a speech 1603 uttered in a sleepy state and a text 1604 having a non-uniform shape as if written in a sleepy state.

Embodiments of the present invention may be applied to various terminal devices to thereby mutually convert and output speeches and texts.

For example, in a refrigerator having a touch panel for inputting a handwriting of a user, a display for outputting the inputted handwriting, and a speaker for outputting sounds, when a plurality of users inputs a handwriting through the touch panel, the display may output the inputted handwriting, the processor may convert each handwriting into a speech according to its corresponding speech style, and output the speech, which is converted by the user's interaction or automatically, through the speaker.

Similarly, in a refrigerator having a microphone for inputting a user's speech and a display for outputting a text, when a plurality of users input speeches through the microphone, the processor may convert each speech into a text according to a corresponding text style and output the text, which is converted by the interaction of the user or automatically, through the display.

Accordingly, a service for converting a speech or a text into a state having a similar style can be provided to the user. In addition, an STT service or a TTS service including emotion may be provided.

According to an embodiment of the present invention, the above-described method may be implemented as a processor-readable code in a medium where a program is recorded.

Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

The invention claimed is:

1. An artificial intelligence (AI) apparatus for mutually converting a text and a speech, comprising:
    a memory configured to store a plurality of Text-To-Speech (TTS) engines, wherein at least one of the plurality of TTS engines is learned using a machine learning algorithm or a deep learning algorithm; and
    a processor configured to:
        obtain image data containing a text,
        determine a speech style corresponding to the text,
        generate a speech corresponding to the text by using a TTS engine corresponding to the determined speech style among the plurality of TTS engines, and
        output the generated speech,
    wherein the processor is further configured to:
        extract text style features from the text included in the image data,
        in response to the text being handwritten, determine a text creator corresponding to an age and a gender based on the text style features,
        determine a speech style corresponding to the determined text creator, and
        adjust the speech style according to the text style features of the text creator being changed, and
    wherein the processor is further configured to:
    compare a shape of a word within handwritten text of the determined text creator with shapes of other words within the handwritten text of the determined text creator,
    in response to the shape of the word within the handwritten text being different than the shapes of the other words within the handwritten text, determine a different speech style for the word that is different than a speech style determined for the other words within the handwritten text of the determined text creator, and
    convert the word into an audio speech segment and output the audio speech segment according to the different speech style.

2. The AI apparatus of claim 1, wherein each of the plurality of TTS engines includes at least one speech style feature, and
    wherein the speech style feature includes at least one of a tone, a pitch, a speed, an accent, a speech volume, or a pronunciation.

3. A method for mutually converting a text and a speech, the method comprising:
    obtaining image data containing a text;
    determining a speech style corresponding to the text;
    generating a speech corresponding to the text by using a Text-To-Speech (TTS) engine corresponding to the determined speech style, wherein the TTS engine is learned using a machine learning algorithm or a deep learning algorithm; and
    outputting the generated speech,
    wherein the determining the speech style comprises:
        extracting text style features from the text included in the image data;
        in response to the text being handwritten, determining a text creator corresponding to an age and a gender based on the text style features; and
        determining the speech style corresponding to the determined text creator, and wherein the method further comprises:
    adjusting the speech style according to the text style features of the text creator being changed, and
    wherein the method further comprises:
    comparing a shape of a word within handwritten text of the determined text creator with shapes of other words within the handwritten text of the determined text creator;
    in response to the shape of the word within the handwritten text being different than the shapes of the other words within the handwritten text, determining a different speech style for the word that is different than a speech style determined for the other words within the handwritten text of the determined text creator; and
    converting the word into an audio speech segment and outputting the audio speech segment according to the different speech style.

* * * * *